12) United States Patent
Keller et al.

(10) Patent No.: US 7,252,847 B2
(45) Date of Patent: *Aug. 7, 2007

(54) FLAVORED EXTRUDED FOOD PRODUCT

(75) Inventors: Lewis Conrad Keller, McKinney, TX (US); Jorge C. Morales-Alvarez, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/622,400

(22) Filed: Jul. 18, 2003

(65) Prior Publication Data

US 2004/0022910 A1 Feb. 5, 2004

Related U.S. Application Data

(63) Continuation-in-part of application No. 10/047,503, filed on Oct. 29, 2001, now Pat. No. 6,620,448.

(51) Int. Cl.
    *A23P 1/12* (2006.01)
(52) U.S. Cl. .................. 426/94; 426/283; 426/249; 426/449; 426/516
(58) Field of Classification Search ................ 426/512, 426/516, 249, 448, 449, 94, 283
See application file for complete search history.

(56) References Cited

U.S. PATENT DOCUMENTS

| 449,854 A | 4/1891 | Herrold |
| 2,764,995 A | 10/1956 | Krupp et al. |
| 2,858,217 A | 10/1958 | Benson |
| 2,858,219 A * | 10/1958 | Benson ........................ 426/93 |
| 3,314,381 A | 4/1967 | Fries et al. |
| 3,345,186 A | 10/1967 | Kania et al. |
| 3,447,931 A | 6/1969 | Benson et al. |
| 3,615,675 A * | 10/1971 | Wisdom et al. ............. 426/281 |
| 3,622,353 A | 11/1971 | Sharnbrook et al. |
| 3,779,676 A | 12/1973 | Bernard |
| 3,885,053 A | 5/1975 | Townsend |
| 3,991,217 A | 11/1976 | Kinney |
| 4,061,786 A | 12/1977 | Winkler et al. |
| 4,395,217 A | 7/1983 | Benadi |
| 4,484,877 A | 11/1984 | Stucke et al. |

(Continued)

FOREIGN PATENT DOCUMENTS

CA  1230005  12/1987

*Primary Examiner*—Drew Becker
(74) *Attorney, Agent, or Firm*—Carstens & Cahoon, LLP; Colin P. Cahoon; Jeffrey G. Degenfelder

(57) ABSTRACT

An extruder die assembly and method for using same is disclosed that may be adapted to a wide variety of commercial-grade extrusion devices common in the food industry. The disclosed method comprises extruding a known composition of a farinaceous food product through the extruder die assembly of the present invention to produce a flavored direct-expanded food product exhibiting enhanced flavor characteristics, but requiring no post-extrusion drying or seasoning process. The injection section of the extruder die assembly is used to impart flavoring additives into the extrudate mass shortly before expansion, thereby preserving the flavoring characteristics of the additive by minimizing the heat exposure of the flavoring additive. The extruder die assembly may also include static mixing elements downstream from the injection section to homogenize the flavoring or seasoning media into the flowing mass of extrudate.

22 Claims, 8 Drawing Sheets

U.S. PATENT DOCUMENTS

| | | | |
|---|---|---|---|
| 4,542,686 A | 9/1985 | Bansal | |
| 4,614,489 A | 9/1986 | Juravic | |
| 4,626,187 A | 12/1986 | Kamada | |
| 4,695,236 A | 9/1987 | Predohl et al. | |
| 4,715,803 A | 12/1987 | Koppa | |
| 4,835,000 A | 5/1989 | Kehoe | |
| 4,869,911 A * | 9/1989 | Keller | 426/94 |
| 4,900,572 A | 2/1990 | Repholz et al. | |
| 4,940,593 A | 7/1990 | Duffy | |
| 5,019,404 A | 5/1991 | Meisner | |
| 5,066,435 A | 11/1991 | Lorenz et al. | |
| 5,102,602 A | 4/1992 | Ziegler | |
| 5,110,276 A | 5/1992 | Farnsworth et al. | |
| 5,216,946 A | 6/1993 | Huang et al. | |
| 5,296,247 A | 3/1994 | Huang et al. | |
| D368,791 S | 4/1996 | Laughlin | |
| D372,352 S | 8/1996 | Laughlin | |
| D373,671 S | 9/1996 | Laughlin et al. | |
| 5,620,713 A | 4/1997 | Rasmussen | |
| 5,639,485 A * | 6/1997 | Weinstein et al. | 425/131.1 |
| 5,643,618 A | 7/1997 | Huberg et al. | |
| D384,785 S | 10/1997 | Laughlin | |
| 5,686,128 A | 11/1997 | Tracy et al. | |
| 5,720,987 A | 2/1998 | Ploog | |
| 5,750,173 A * | 5/1998 | Kazemzadeh | 426/516 |
| 5,759,603 A | 6/1998 | Francisco et al. | |
| 5,827,557 A | 10/1998 | Weinstein et al. | |
| 5,843,503 A | 12/1998 | Clanton et al. | |
| 5,955,116 A | 9/1999 | Kehoe et al. | |
| 6,132,079 A * | 10/2000 | King | 366/181.5 |
| 6,143,338 A | 11/2000 | Weinstein et al. | |
| 6,143,339 A | 11/2000 | Weinstein et al. | |
| 6,143,342 A | 11/2000 | Weinstein et al. | |
| 6,170,979 B1 * | 1/2001 | Smeaton | 366/173.1 |
| 6,251,452 B1 | 6/2001 | Weinstein et al. | |
| 6,509,049 B1 * | 1/2003 | Parsons et al. | 426/250 |
| 6,620,448 B2 * | 9/2003 | Keller et al. | 426/512 |

* cited by examiner

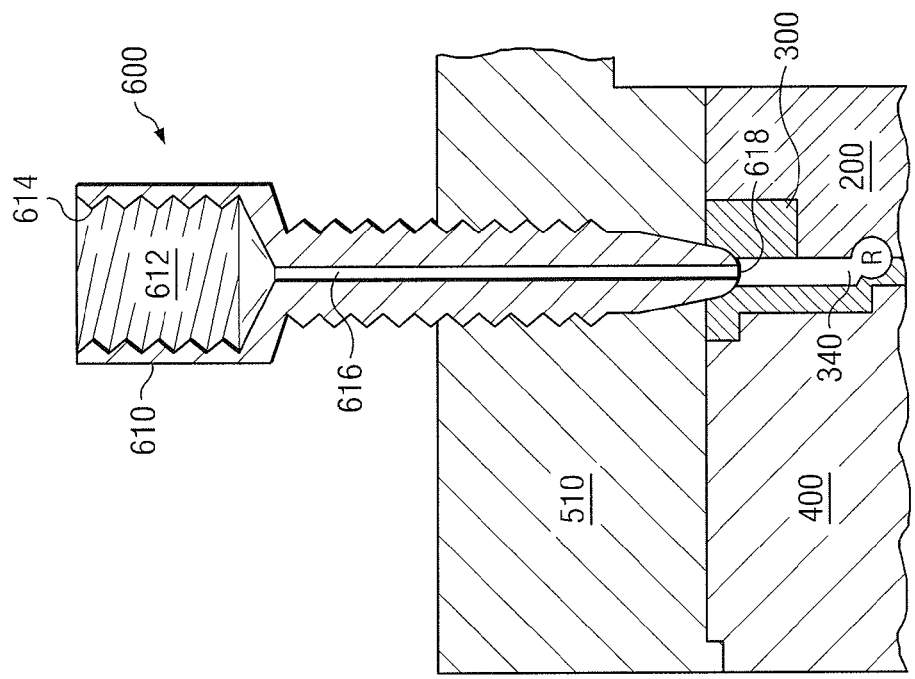
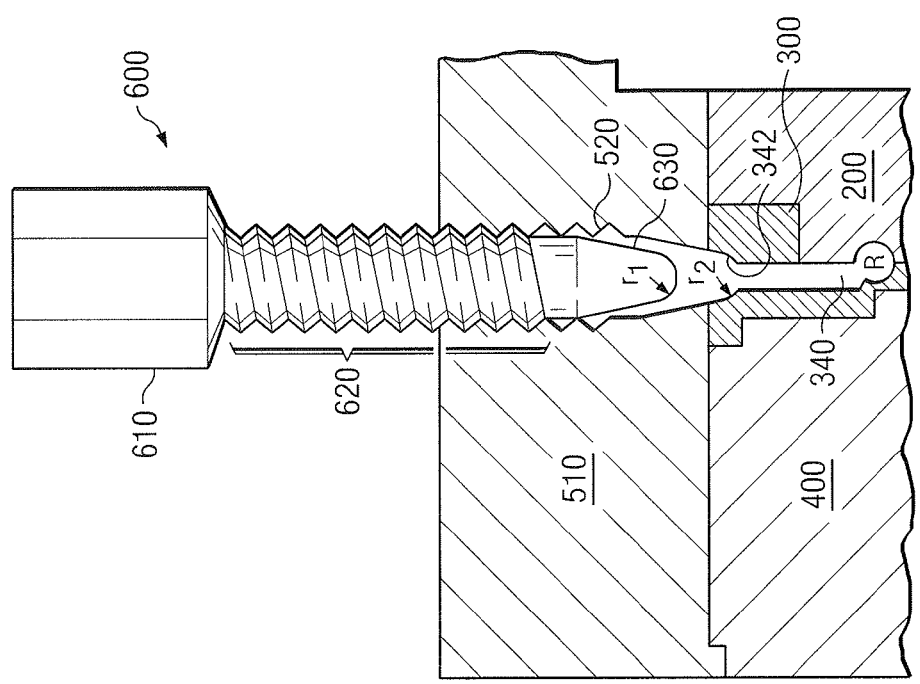

FLAVORED EXTRUDED FOOD PRODUCT

CROSS-REFERENCE TO RELATED APPLICATION

This application is a continuation-in-part of U.S. patent application Ser. No. 10/047,503 (now U.S. Pat. No. 6,620,448), filed on Oct. 29, 2001, the technical disclosure of which is hereby incorporated herein by reference.

BACKGROUND OF THE INVENTION

1. Technical Field

The present invention generally relates to the production of flavored, direct expanded (i.e., puff extruded) farinaceous food products utilizing an apparatus and method for adding a fluid additive into an extrudable food mass. More specifically, the invention is concerned with an improved extruder die assembly and method for using same to impart a distinct colored and/or flavored pattern into an extrudable food mass during extrusion, and with a method and composition for producing a dried, flavored, direct-expanded food product requiring no post-extrusion drying or seasoning process by utilizing the improved extruder die assembly.

2. Description of the Related Art

The use of extrusion devices is prevalent in a number of industries, especially the food industry. Utilized to produce a variety of products such as ready-to-eat (R-T-E) cereals, snack foods and confections, extrusion remains prominent among food processes because of its versatility and efficiency.

Food processes utilizing extrusion devices typically include an edible substance such as dough which is introduced into a device and conveyed via a screw pump to an inlet where the substance is forced through an extruder die. The extruder die may perform a variety of functions: it may form or shape the extrudate; it may divide the extrudate into a multiple extrudates; it may inject an additive substance into the extrudate; and it may compress and reduce the cross-sectional area of the extrudate.

Examples of devices used for extrusion of food products are illustrated in U.S. Pat. Nos. 2,858,217; 3,314,381; and 5,639,485. While extrusion dies have evolved over the years, the method by which an additive substance is supplied and injected into the extrudate has remained essentially unchanged.

For Example, in U.S. Pat. No. 2,858,217 to Benson, the introduction of coloring matter, such as a colored liquid dye, is accomplished via a series of apertures 40, 42, 44 disposed in the bridging strips 32, 34, 36 and supplied by horizontal passages 52, 54, 55 which are in fluid communication with the dye reservoir 46. The supplying of the liquid dye from the dye reservoir 46 to series of apertures 40, 42, 46 is by means of gravitational force. According to the Benson '217 device, dough material 18 is extruded through a divider block 22 which forces the dough material 18 to divide or spread around the bridging strips 32, 34, 36 so that voids 38 are formed into which the coloring matter is introduced via the series of apertures 40, 42, 44.

Similarly, in U.S. Pat. No. 3,314,381 to Fries et al., the fluid injection assembly is comprised of a hollow tubular injection member 29 in a helical spiral configuration, which includes a bore 37 through which pressurized injection fluid is supplied from a source 25 to a plurality of longitudinally spaced bores 39 into a distributing channel 38. The fluid along the length of channel 38 is injected into the passing dough as a substantially longitudinally continuous spiral band extending from substantially the central axis of the dough to either the outer face of the dough or a point short thereof. However, the Fries et al. '381 device is primarily adapted to relatively low pressure comestible extrusions.

Finally, U.S. Pat. No. 5,639,485 to Weinstein et al. and its related patents, disclose a method and apparatus for adding additives in flowing dough to make complexly patterned multicolored extrudates. The Weinstein et al. '485 invention and its progeny all disclose a high pressure extrusion device comprising an extruder die insert 20 which includes means for imparting at least one interstitial gap in the flowing dough by means of a plurality of dividing passageways (e.g., 44, 45, 46) formed by die dividing members 47. An additive (e.g., a food color or a second colored dough) may be injected via a plurality or array of evenly spaced food color injection ports 48 formed on the downstream side of die dividing member 47. The injection ports 48 are in fluid communication with a pressurized color supply 18 by means of a supply ports 52, 54, 56 and supply passageway 50. The color fluid tends to fill the interstitial gaps in the flowing dough between passageways (e.g., 44, 45, 46) formed by and behind the die dividing members 47 to create a line in the shape of dividing members 47 in the extruded dough. The die insert 20 also includes notches 57 which are used to isolate the color fluid injected into the interstitial gap from spreading to the interior surface wall of die insert 20 thereby reducing if not eliminating the leakage on color fluid onto the outside of the extruded dough. Additionally, the die insert 20 can further include a means for sealing (e.g., "O" rings 60 and 62 as depicted) the color fluid supply reservoir 58 against premature admixture with dough.

In addition to the die insert element, the Weinstein et al. '485 invention also comprises a reducing passageway 25 whereby the extrudate's cross-sectional area is significantly reduced. At high operating pressures, the convergence of the passageway 25 inherently creates a significant back pressure on the downstream side of the extruder die insert 20 which, in turn, can contribute to and promote the clogging of the individual injection ports 48. Moreover, the utilization of notches 57, sealing means 60, 62 and multiple enclosed injection ports 48 further complicates the design of the die insert making it harder to clean and maintain. Finally, injecting color fluid at discrete locations into downstream voids or interstitial gaps to disperse the fluid in a generally uniform manner requires precise control of flow rates, internal pressures, and viscosity of the extrudate and various additives. Furthermore, the design of each die insert 20 is limited to the physical constraints imposed by the previously mentioned design elements.

What is needed is an extruder die assembly capable of operating at a variety of operating pressures which has improved seal characteristics and is simpler and easier to maintain and whose injection mechanism is less prone to clogging and blockages.

In addition, extrusion devices are increasingly utilized to impart heat to the base substance during its transit through the extruder device. Typically, a casing surrounding the extrusion chamber is adapted to impart heat to the substance in accordance with practices commonly known in the art. For example, cooker extruders are used to prepare cooked dough extrudates that may then be formed into individual cereal or snack pieces, and subsequently baked or fried. One variation of cooker extruders that is increasingly popular comprises an extruder wherein the conditions of the extruder and the cooked cereal dough are such that the dough puffs immediately upon being extruded and is cut into individual puffed pieces at the die head. Such a process is referred to generally as "direct expansion" or "puff extrusion."

The flavoring of extruded food products typically comprises either flavoring the base substance prior to its introduction to the extruder device, adding a flavoring to the base substance within the extruder device wherein it is admixed utilizing a screw pump mechanism, or flavoring the resulting extruded food piece subsequent to the extrusion process. However, inducing heat to the base substance during an extrusion process adversely affects the flavoring of the resulting extruded food product. Many flavoring are particularly sensitive to heat induced during the manufacturing process. For example, spicy flavorings (e.g., green pepper, chiplotle, and jalapeño) and salty dairy flavors (e.g., cheddar cheese and sour cream) are particularly susceptible to flavor diminishment or deterioration when exposed to heat for an extended period of time during a direct expansion extrusion process. Even sweet flavorings (e.g., strawberry, chocolate, vanilla, etc.), while more heat tolerant than other flavoring, are, nevertheless, somewhat degraded when exposed to heat during the manufacturing process. Thus, the flavoring of direct expansion food products usually occurs during a separate seasoning step, which occurs subsequent to the direct expansion extrusion process. Flavorings are typically sprinkled on and admixed with a mass of direct expansion food product on a conveyor belt mechanism or in a tumbling drum mechanism. The tumbling mechanism ensures even coverage of the extruded product.

While the adverse effects caused by heat on flavorings can be avoided by utilizing an extruder mechanism which does not induce heat to the base substance during an extrusion process, the resulting flavored extruded pieces will typically still require a subsequent drying process. Moreover, the dried, flavored, extruded pieces will also have to be subsequently baked or fried, which will similarly affect adversely the quality of the flavoring.

Thus, a need exists for a more efficient system for flavoring extruded food products during a production run of a cooker extrusion device. In this regard, it would be particularly desirable if the seasoning or flavoring of direct expanded food products could be accomplished in a one-step extrusion process (i.e., without a separate seasoning step subsequent to the extrusion process and without a substantial degradation of heat sensitive flavorings injected prior to the extrusion process).

SUMMARY OF THE INVENTION

The present invention overcomes many of the shortcomings inherent in previous methods and systems addressing extruder die assemblies. The present invention comprises an improved extruder die assembly and method for using same to impart a distinct colored and/or flavored pattern into an extrudable food mass during the extrusion process.

In one embodiment, the system comprises an extruder die assembly and method for using same which includes a forming section and an injection section fabricated as a matching set. When properly aligned and coupled, the matching set forms a peripheral reservoir manifold, internal to the die assembly, through which a fluid additive may be supplied via a supply port to at least one and more preferably a plurality of capillary channels which in turn impart a distinct cross-sectional design into a flowing mass of a first extrudate.

In another embodiment, the system and method for using the present invention includes partitioning the internal peripheral reservoir manifold so that a plurality of supply ports may be used to allow different colors and/or flavors to be injected at different locations in the distinct cross-sectional design.

In another embodiment, the system and method for using same utilizes multiple matched sets of forming sections and injection sections in tandem to impart multiple pattern designs into an extrudable food mass.

In another embodiment, the system and method for using same utilizes multiple matched sets of forming sections and injection sections in tandem to impart multiple pattern designs of differing colors and/or flavors into an extrudable food mass.

In another embodiment, the system and method for using same utilizes a converging nozzle to decrease the extrudate's cross-sectional area while maintaining the distinct cross-sectional design pattern imparted into the extrudate.

Thus, in accordance with one feature of the invention, the present invention is comprised of an extruder die assembly capable of operating at a variety of operating pressures which has improved seal characteristics and is simpler and easier to maintain. Moreover, the performance of the extruder die assembly of the present invention is more stable in that surging of the fluid additive is inhibited thereby resulting in a continuous well defined pattern being injected into the extrudable food mass.

In accordance with another feature of the invention, the present invention is comprised of an extruder die assembly whose injection mechanism is less prone to clogging and blockages. The system of the present invention allows the flow of the extrudable food mass to be momentarily halted without permanently plugging the supply passageways or injection section(s).

A novel feature of the invention is an injection nozzle which supplies fluid additives from an exterior pressurized source to a supply port formed in the extruder die assembly. The subject injection nozzle exhibits superior sealing qualities in conjunction with simplicity and flexibility. The minimal affected space required to receive the subject injection nozzle allows a single extruder die assembly to have more than one supply port fashioned therein. Thus, multiple injection nozzles may be used to supply a single extruder die assembly with multiple colors and/or flavors. The injection nozzle of the present invention also exhibits a unique dual seal characteristic, which is particularly effective in conditions involving high temperature. The subject injection nozzle is also highly flexible in that one injection nozzle may be used interchangeably with another (i.e., each injection nozzle is not unique to a particular supply port).

A novel food product may also be produced in accordance with another feature of the invention, wherein a known composition of a farinaceous food product is extruded through the extruder die assembly of the present invention to produce a flavored direct-expanded food product exhibiting enhanced flavor characteristics while requiring no post-extrusion drying or seasoning process. The injection section of the extruder die assembly is used to impart flavoring additives into the extrudate mass shortly before expansion, thereby preserving the flavoring characteristics of the additive by minimizing the heat exposure of the flavoring additive. The extruder die assembly may also include static mixing elements downstream from the injection section to homogenize the flavoring or seasoning media into the flowing mass of extrudate. In particular, the present invention may be used to combine heat sensitive flavorings into a farinaceous food mixture to produce a flavored, direct expanded, farinaceous food product without the use of a drying apparatus or a seasoning step subsequent to the extrusion process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5b and 5c are enlarged sectional views of the interface between the extruder die assembly and associated injection nozzle shown in FIG. 5a.

Figure 1A:
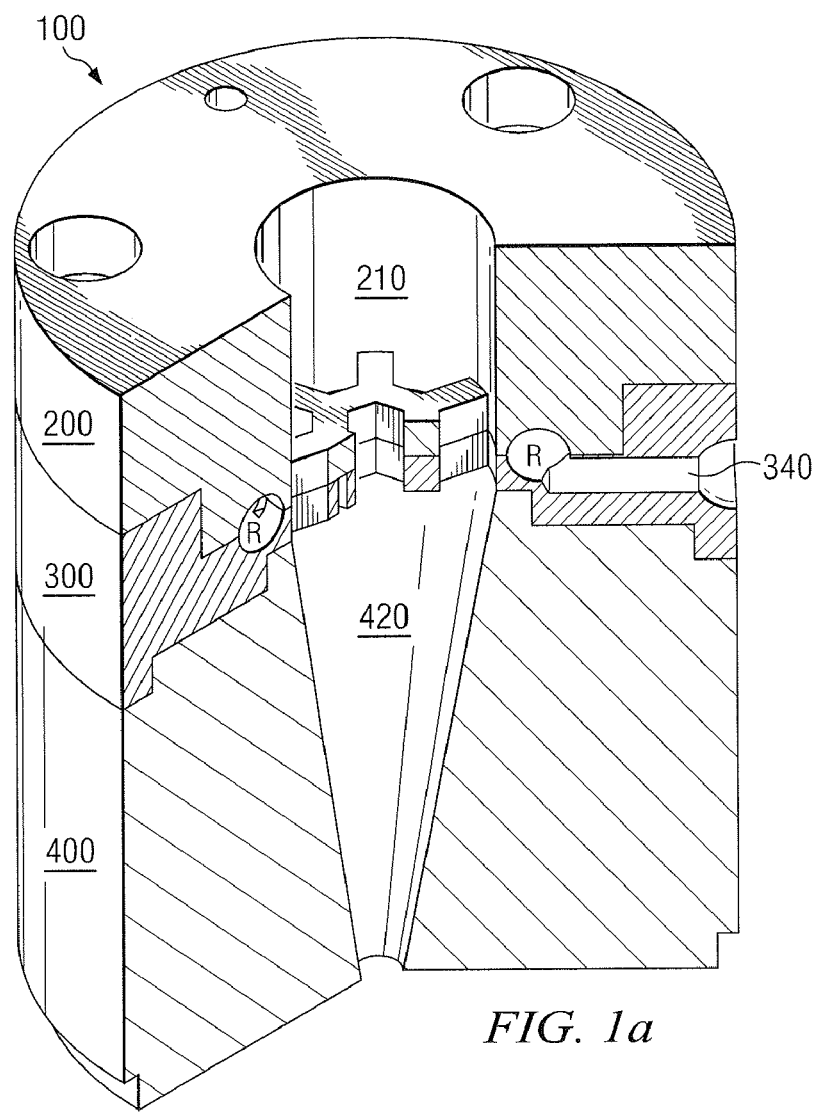
FIG. 1a is a cut-away perspective view of the extruder die assembly of the present invention.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE DRAWINGS

Figure 1B:
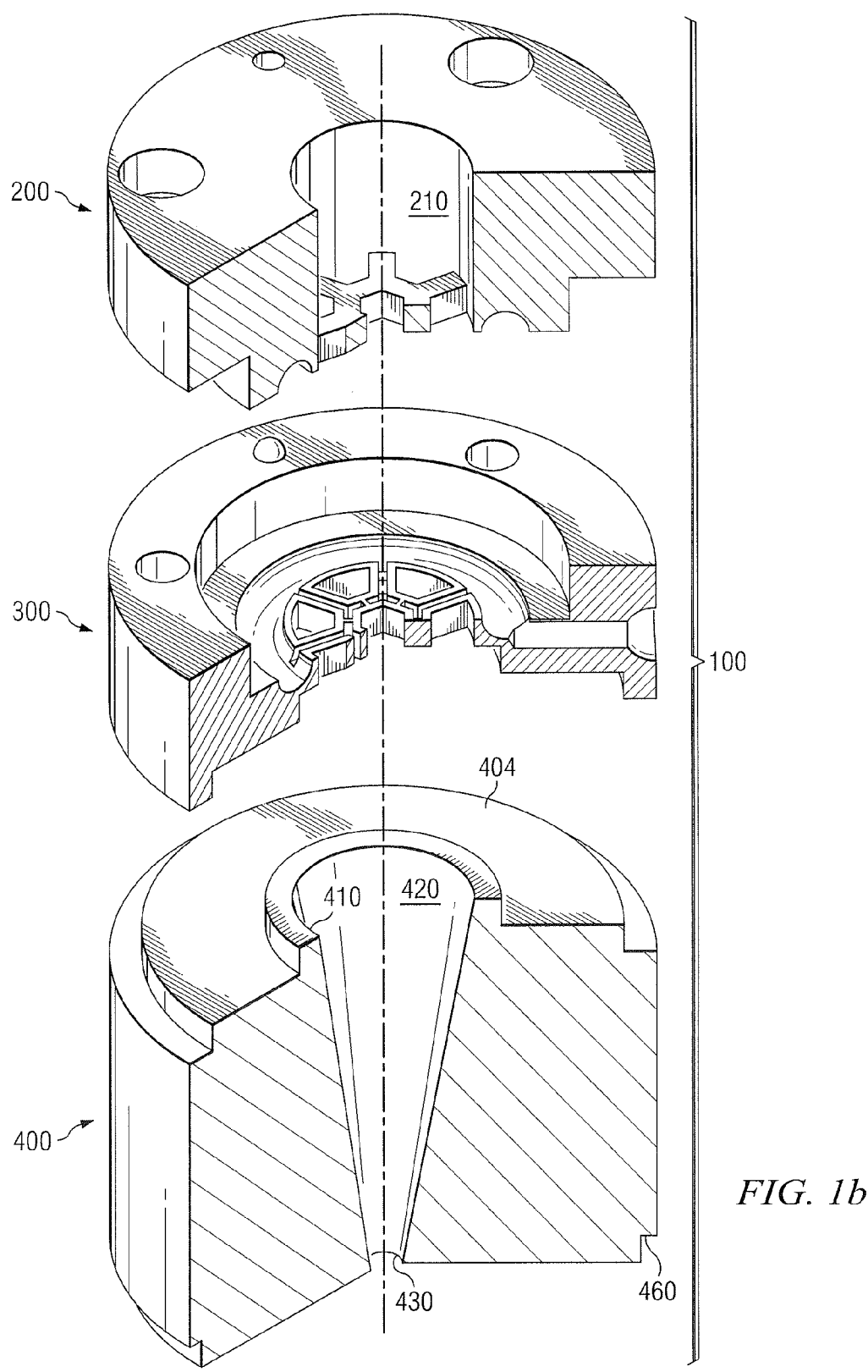
FIG. 1b is a cut-away exploded perspective view of the extruder die assembly of the present invention.

An extruder die assembly, generally indicated by reference character 100 in FIGS. 1a and 1b, includes a forming section 200, an injection section 300, and a nozzle section 400. The three sections comprising the die assembly 100 are coaxially aligned and interlocking. Additionally, means for coupling the forming section 200 to the injection section 300 are also included.

The extruder die assembly 100 is designed for adaptation to a wide variety of commercial-grade extrusion devices common in the food industry. The extruder die assembly 100 is inserted into an appropriate compartment within an extrusion device (not shown) such that a first extrudate (e.g., a paste or a cereal dough) is directed down a coaxially aligned passageway 210 within the forming section 200 and combined with a fluid additive (e.g., a food coloring dye or a flowable colored and/or flavored food material) in the injection section 300 via supply port 340 and annular reservoir R, whereupon the resulting food mass is compressed through a converging nozzle bore 420 in the nozzle section 400 to produce an extruded food product containing a distinct colored and/or flavored pattern.

While the embodiment illustrated is shown as being generally cylindrical in shape, the exterior housing of the die assembly 100 may be of any shape necessary for adaptation to commercial-grade extrusion devices common in the food industry. Similarly, while passageway 210 and bore 420 are depicted as having a circular cross sectional area, in other embodiments, passageway 210 and bore 420 can be fabricated with a more complex peripheral configuration to define or define in part the exterior shape or configuration of the finished piece, including both regular shapes (e.g., stars, rings, geometric shapes) as well as irregular shapes (e.g., animals, vegetables, objects such as trees, cars, etc.).

Figure 2A:
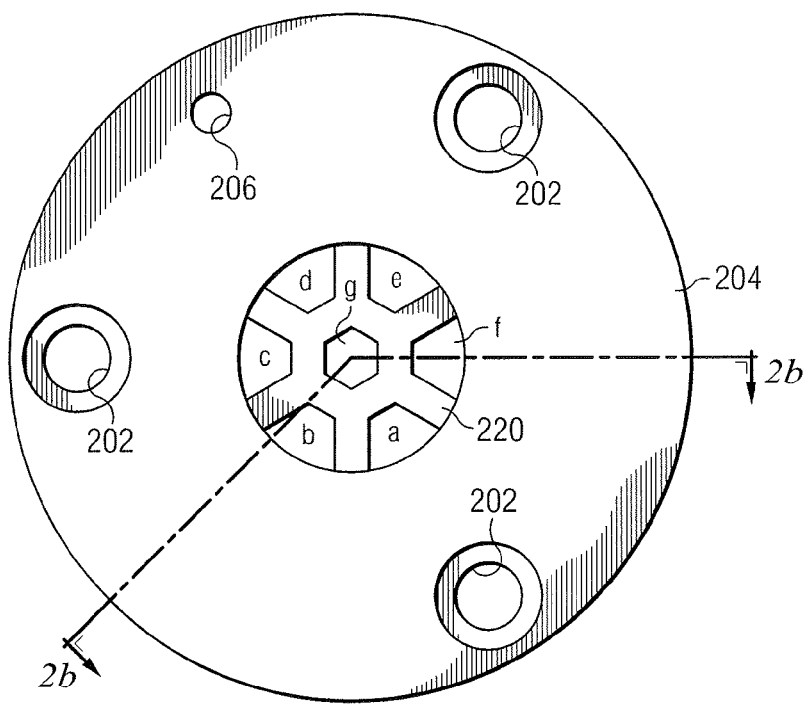
FIG. 2a is an overhead view of the forming section of the extruder die assembly of the present invention.
Figure 2B:
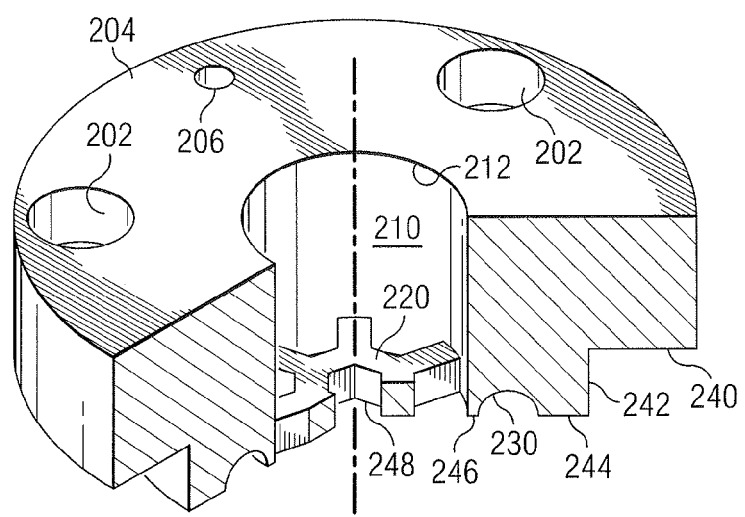
FIG. 2b is a cut-away perspective view of the forming section of the extruder die assembly of the present invention.

Referring to the figures, and in particular FIGS. 2a and 2b, the forming section 200 is a generally tubular flange element having a central bore defining a passageway 210. The inlet 212 of the passageway 210 is adapted to receive a conduit (not shown) supplying a pressurized first extrudate from an extrusion device (not shown). A plurality of counter-sunk coupling holes 202, equally spaced around the periphery of the entrance face 204 of forming section 200, are provided for receiving screws (not shown) for removably coupling the forming section 200 to threaded holes 302 in the injection section 300. An alignment hole 206 extends through the forming section 200 in parallel alignment with the passageway 210 to receive an alignment knob 306 on the entrance face 304 of the injection section 300. When properly seated into the alignment hole 206, the alignment knob 306 ensures that the axial angular alignment of the injection section 300 in relation to the forming section 200 is correct.

The outlet portion of the passageway 210 includes a forming die element 220 which divides the flow of the first extrudate into at least two, and more preferably a plurality of adjacent flowing extrudate passageways such as passageways a-g respectively formed by forming die element 220.

The forming section and injection section are fabricated as a matching set. In general, the outlet portion of the forming section is designed to mate and seal with the inlet portion of the injection section. In one embodiment, an inner peripheral rim formed in the outlet portion of the forming section is specifically designed to slidably couple and align with a central bore in the inlet portion of the injection section. The inner peripheral rim is defined by a peripheral notch formed in the outlet face of the forming section. The peripheral notch is characterized by a peripheral rim wall which is parallel with and generally equidistant from the outer periphery of the central passageway. The inner peripheral rim includes a peripheral groove with a semicircular cross-section. A matching peripheral groove with a semicircular cross-section is formed in the base of the central bore of the inlet portion of the injection section such that when the forming section and injection section are slidably coupled and aligned, an internal peripheral reservoir manifold with a circular cross-section is formed.

Figure 3A:
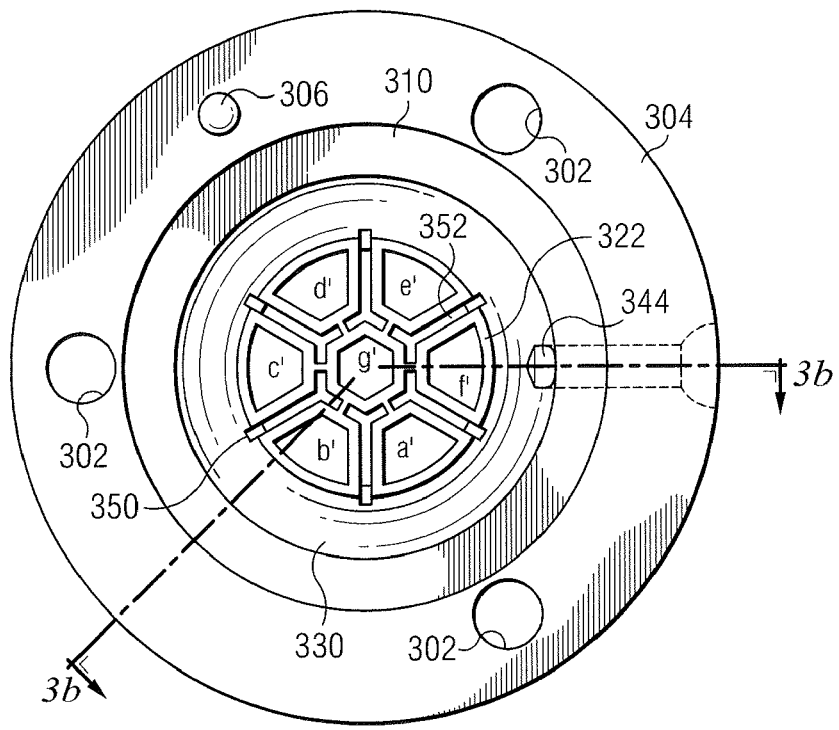
FIG. 3a is an overhead view of the injection section of the extruder die assembly of the present invention.
Figure 3B:
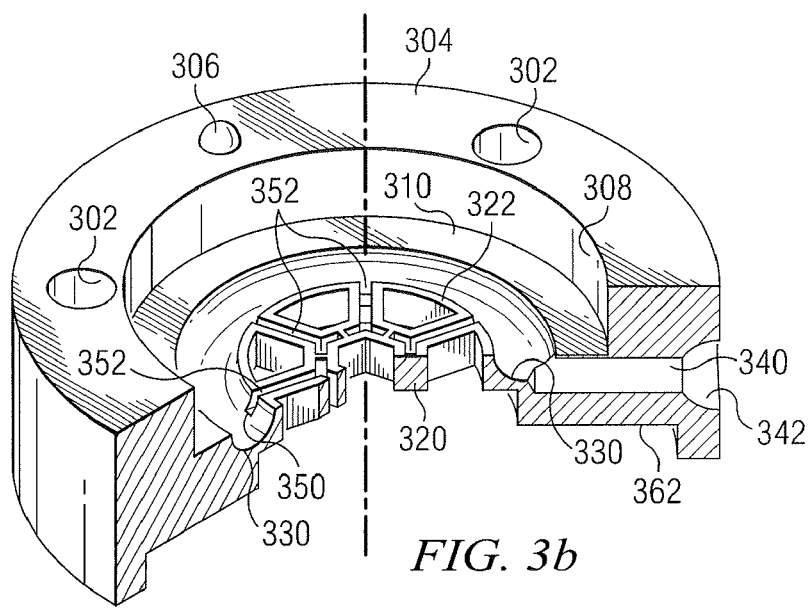
FIG. 3b is a cut-away perspective view of the injection section of the extruder die assembly of the present invention.

Thus, as shown in the figures, and in particular FIGS. 2b, 3a, and 3b, when the present invention is realized in an embodiment having a generally circular cross section, the inner peripheral rim formed in the outlet portion of the forming section 200 is an annular rim defined by an annular notch, characterized by the annular rim wall 242 and the annular outer ring seal face 240, around the outer periphery of the outlet face of the forming section 200. The annular rim in the outlet portion of the forming section 200 slidably fits into a central bore in the inlet portion of the injection section 300 defined by the annular bore wall 308 such that the forming section's annular outer ring seal face 240 seats and seals with the injection section's annular outer seal face 304, the forming section's intermediate annular seal face 244 seats and seals with the injection section's annular intermediate ring seal face 310, and the forming section's inner annular seal face 246 and the exit face 248 of the forming die element 220 seat and seal with the entrance face 322 of the injection section's co-injection die insert 320. Moreover, the matching annular peripheral grooves 230 and 330 form an annular internal peripheral reservoir manifold R into which a fluid additive may be supplied. When properly aligned and coupled, the respective-annular seals between the forming section 200 and the matching injection section 300 effectively seal and isolate the fluid additive supplied to the reservoir manifold R from inadvertent leakage to the upstream side of the forming die element 220 and the outer periphery of the extruder die assembly 100.

The injection section 300 includes a co-injection die insert 320 which has profile such that when properly aligned with the forming die element 220, passageways a'-g' are respectively adjoined with passageways a-g formed by forming die element 220. When properly aligned and coupled, the seal between the exit face 248 of the forming die element 220 and the entrance face 322 of the injection section's co-injection die insert 320 ensures that the respective adjacently flowing extrudate passageways are unobstructed and contiguous and that the fluid additive contained in the reservoir manifold R does not inadvertently leak to the upstream side of the forming die element 220.

The co-injection die insert 320 includes at least one and more preferably a plurality of capillary channels 352 in the space between the plurality of passageways. The capillary channels 352 are fluidly connected to the reservoir manifold R via channel ports 350. The reservoir manifold R is fluidly connected to a pressurized source of fluid additive (not shown) via supply port 340.

When properly aligned and coupled, the seal between the exit face 248 of the forming die element 220 and the entrance face 322 of the injection section's co-injection die insert 320 ensures that the pressurized fluid additive supplied to the annular internal peripheral reservoir manifold R continually charges the capillary channels 352 via channel ports 350 whereupon each capillary channel 352 emits at its downstream exit face a continuous discharge of fluid additive in the general cross-sectional shape of the capillary channel 352 resulting in a continuous band of fluid additive being injected into the transient clefts formed in the first extrudate as it exits the adjacent flowing extrudate passageways such as passageways a'-g'. Upon exiting from the individual adjacent flowing extrudate passageways (e.g., passageways a'-g'), the individual adjacently flowing columns of first extrudate coalesce to enclose the injected bands of fluid additive within a single flow mass thereby imparting a distinct colored and/or flavored pattern into the food mass.

In an alternative embodiment of the present invention, the injection section 300 may include multiple supply ports 340 fluidly connected to separate pressurized sources of fluid additive. In such an embodiment, the annular internal peripheral reservoir manifold R may be divided into multiple segregated quadrants fluidly connecting individual pressurized sources of fluid additive to specific capillary channels 352 allowing a distinct pattern of multiple colors and/or flavors to be imparted into the food mass.

In one embodiment of the present invention, the exit face 362 of the injection section 300 is generally designed to mate and seal with the inlet face 404 of the nozzle section 400. With the exception of the co-injection die insert 320, the inlet face 404 of the nozzle section 400 is essentially a mirror image of the exit face 362 of the injection section 300. In general, the nozzle section 400 includes an inlet with a periphery matching the periphery of the forming section's passageway. The nozzle section further includes a passageway coaxially aligned with the forming section's passageway which converges to an outlet. As the passageway converges, the passageway's cross-sectional decreases while its aspect ratio is generally maintained. Thus as shown in the figures, and in particular FIGS. 1b and 3b, when the present invention is realized in an embodiment having a generally circular cross section, the nozzle section 400 includes an inlet 410 with an inner annular periphery which matches the periphery of the forming section's passageway 210. The nozzle section further includes a passageway 420 coaxially aligned with the forming section's passageway 210 which converges to an outlet 430.

In an actual embodiment having a circular cross section as illustrated in FIG. 1b, the diameter of passageway 420 is reduced from 0.664 inches at inlet 410 to 0.332 inches at outlet 430. In another such embodiment, the diameter of passageway 420 is further reduced from 0.664 inches at inlet 410 to 0.153 inches at outlet 430.

Alternatively, in another embodiment of the present invention, multiple sets of matching forming/injection sections may be adjoined in a tandem or series arrangement. In such an embodiment, the inlet face of a second set's forming section is designed to mate and seal with the exit face of a first set's injection section. Arranging multiple sets of matching forming/injection sections in tandem allows multiple pattern designs of differing colors and/or flavors to be imparted into an extrudable food mass.

Figure 4:
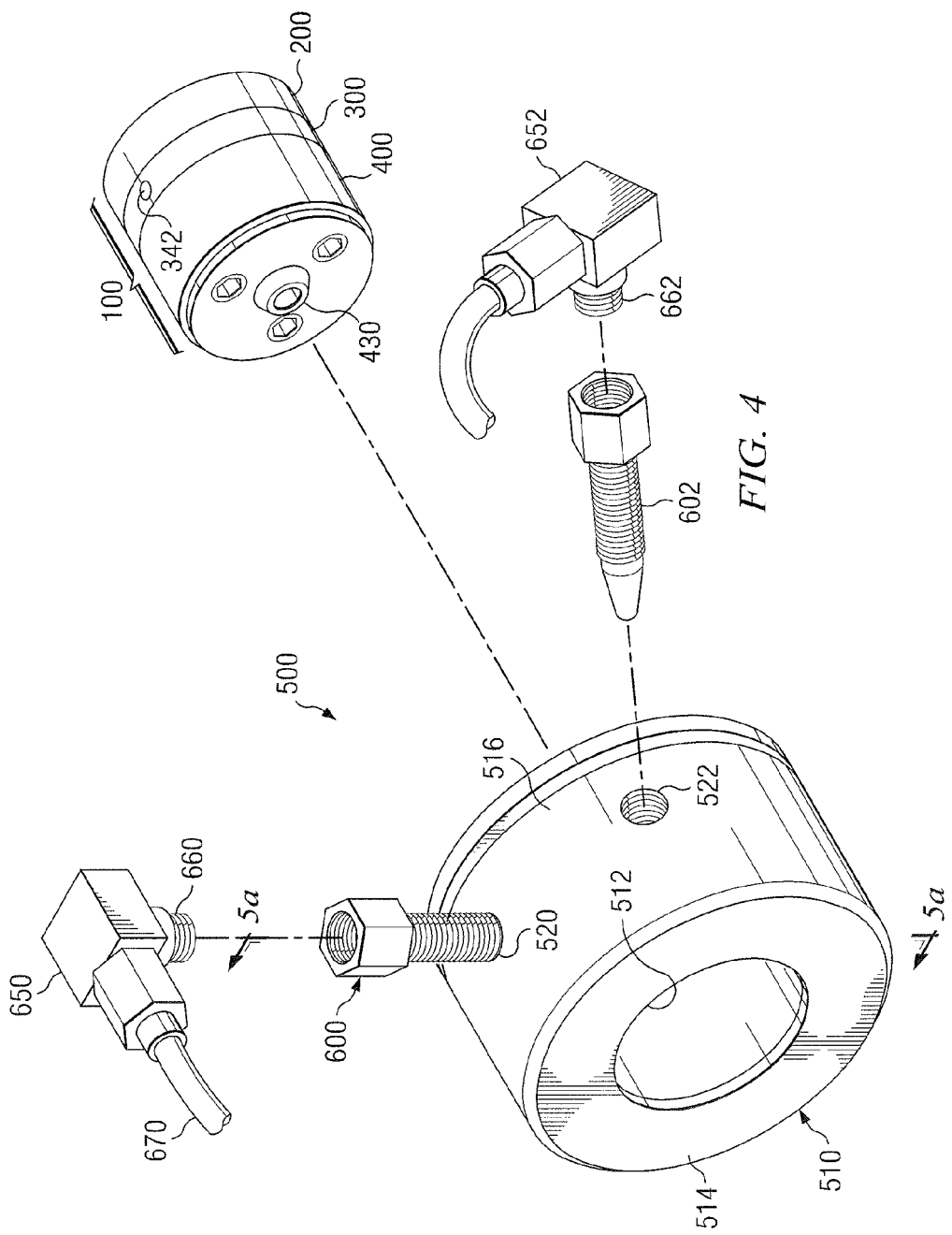
FIG. 4 is a perspective in partially exploded view of the exit face of a die plate assembly attached to a food cooker extruder showing the extruder die assembly of the present invention and associated injection nozzle assemblies.

As previously noted, the extruder die assembly 100 of the present invention is designed for adaptation to a wide variety of commercial-grade extrusion devices common in the food industry. The extruder die assembly 100 is typically inserted into a sealable compartment attached to or within an extrusion device (not shown), such that the inlet 212 of the forming section 200 of the extruder die assembly 100 is connected via a conduit to an output port of the extrusion device. For example, as illustrated in FIG. 4, such a compartment may comprise a die plate assembly 500 attached to the outlet section of a conventional cooker extruder device. The die plate assembly 500 includes a main die plate 510 having a main bore 512 defined therethrough for receiving an extruder die assembly 100. The circumferential dimensions of the main bore 512 is complementary to that of the extruder die assembly 100, so as to ensure a snug fit and minimal extrudate leakage therebetween. When an extruder die assembly 100 is inserted into the main bore 512 of the main die plate 510, the outlet 430 of the nozzle section 400 protrudes slightly past the exit face 514 of the main die plate 510.

The main die plate 510 also includes an injection port 520 formed in the sidewall 516 of the main die plate 510 for receiving an injection nozzle 600. The injection port 520 extends through the sidewall 516 to the main bore 512 at an angle generally perpendicular to the longitudinal axis of main bore 512. The injection port 520 is further positioned such that when an extruder die assembly 100 is inserted into and properly aligned with the main die plate 510, the injection port 520 aligns with a corresponding supply port inlet 342 formed in the injection section 300 of the extruder die assembly 100. The main die plate 510 may further include additional injection ports (e.g., 522) for receiving additional injection nozzles (e.g., 602), for use with an extruder die assembly 100 having multiple supply port inlets 342 formed in the injection section 300 thereof. When not required, the additional injection ports (e.g., 522) may be sealed with a suitable plug device (not shown).

In addition, the die plate assembly 500 also typically includes a conventional feed plate (not shown) which seals the entrance face of the main die plate 510 and has a passageway defined therethrough which acts as a conduit between the output port of the extrusion device and the inlet 212 of the forming section 200 of the extruder die assembly 100. The feed plate may also provide attachment points for connecting the die plate assembly 500 to the outlet section of the extrusion device.

Figure 5A:
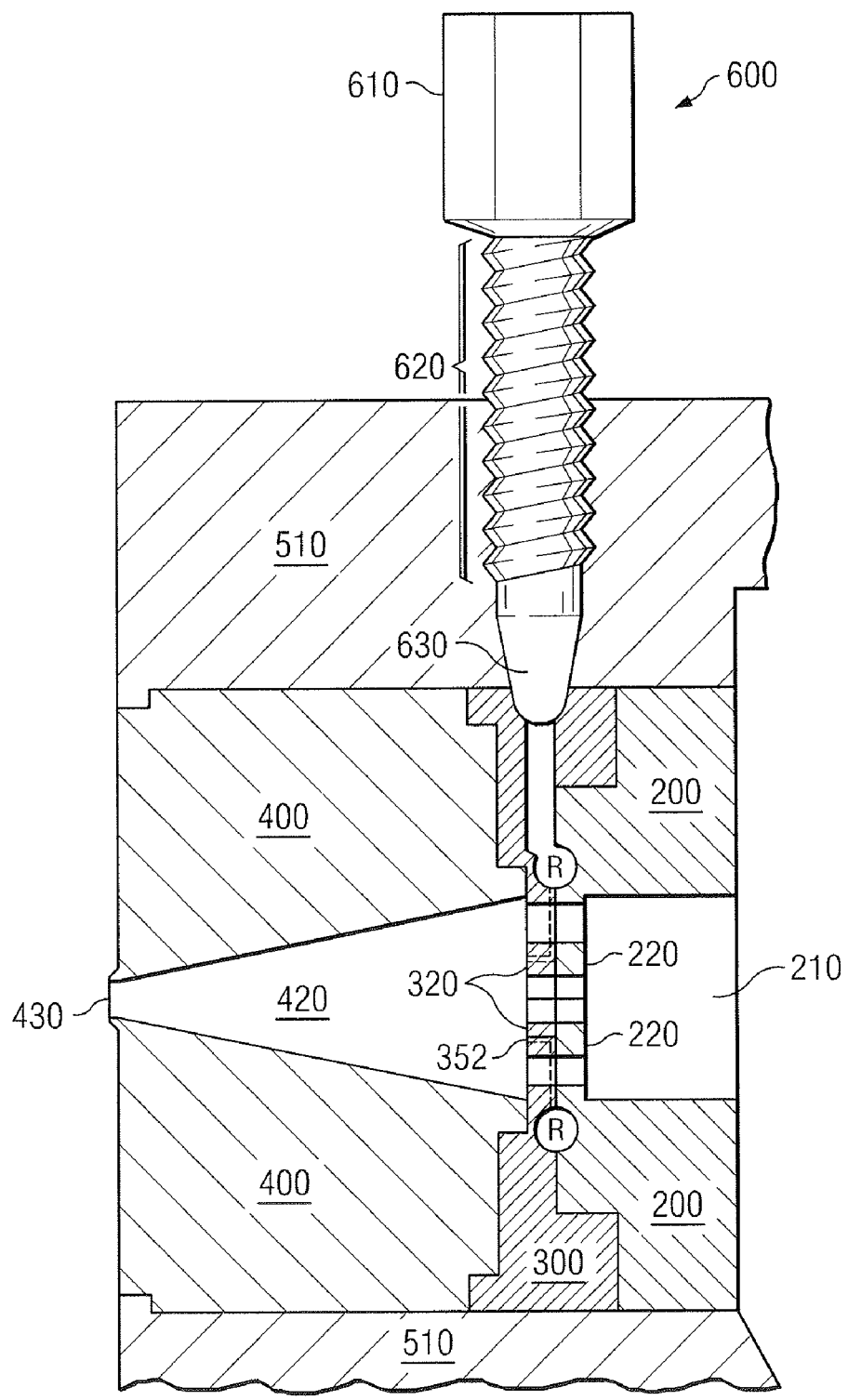
FIG. 5a is a partial sectional view of the die plate assembly taken along lines 5-5 in FIG. 4, showing the extruder die assembly and injection nozzle of the present invention properly aligned and inserted therein.

Referring now to the Figures, and in particular to FIGS. 5a, 5b and 5c, which depict various cross-sectional views of the die plate assembly illustrated in FIG. 4, a novel feature of the invention is shown, which comprises an injection nozzle 600 that supplies fluid additives from an exterior pressurized source to a supply port 340 formed in the injection section 300 of the extruder die assembly 100. The injection nozzle 600 of the present invention exhibits enhanced sealing characteristics while supplying pressurized fluid additives to an extruder die assembly 100 inserted in a die plate assembly attached to a conventional cooker-extruder device.

The injection nozzle 600 generally comprises an inlet section 610, a mid-section 620, and a outlet section 630. The inlet section 610 is designed to receive and couple with a pressurized additive supply line 670 so as to establish fluid communication with the exterior pressurized source. In the embodiment shown in the Figures, the inlet section 610 comprises a standard hexagonal NPT threaded female fitting which is designed to engage a conventional threaded male fitting 650 attached to the pressurized additive supply line 670.

The mid-section 620 comprises an externally threaded barrel having a smoothbore interior passageway 616 in fluid communication with an inlet space 612 defined in the inlet section 610. The threaded mid-section 620 allows the injection nozzle 600 to be securely mounted into the threaded injection port 520 formed in the main die plate 510, thus forming a leak-proof assembly.

The outlet section 630 comprises a smooth, tapered end having a discharge port 618 at its distal end which is in fluid communication with the interior passageway 616. The diameter of the discharge port 618 is typically less than the diameter of the supply port 340. The outlet section 630 is generally paraboloididal shaped having a spherical tip of a given radius $r_1$. The spherical tip of the outlet section 630 is complementary with the spherical concavity of a given radius $r_2$ which defines the supply port inlet 342 formed in the injection section 300 of the extruder die assembly 100. The complementary shapes of the spherical tip of the outlet section 630 and the supply port inlet 342 provide a relatively larger contact area per unit volume of perforation inside the injection section 300 of the extruder die assembly 100, thereby resulting in an enhanced sealing mechanism. The resulting increase in the metal-to-metal contact between the outlet section 630 of the injection nozzle 600 and the supply port inlet 342 thereby facilitates a non-invasive fluid connection with robust sealing characteristics.

Thus, in addition to the threaded portion 614 of the inlet section 610, which effectively seals the connection between the injection nozzle 600 and the pressurized additive supply line 670, the injection nozzle 600 of the present invention exhibits a unique dual seal characteristic. First, the threaded mid-section 620 effectively seals the injection port 520 preventing extrudate from leaking out from the interior main bore 512. Second, the complementary shapes of the spherical tip of the outlet section 630 and the supply port inlet 342 effectively seals the pressurized fluid additives from leaking out to the outer periphery of the extruder die assembly 100.

The dual seal characteristic is particularly effective in conditions involving high temperature. In such conditions, components of the die plate assembly 500 typically expand, oftentimes resulting in a corresponding increase in the gap between the extruder die assembly 100 and the interior main bore 512. The dual seal characteristic of the injection nozzle 600 allows both sealing mechanisms to be adjusted, independent of one another, in response to changes induced by high temperature conditions.

Furthermore, the injection nozzle 600 of the present invention promotes a simpler and more flexible injection system. For example, while in theory a sealing thread mechanism could be extended along the entire length of the nozzle, this would require a much larger volume of perforation inside the injection section of an extruder die assembly to achieve an equivalent contact and sealing area. Moreover, to insure a continuous threaded seal, the bore of the injection port and the supply port inlet would have to be threaded concurrently, thereby dictating a matched set arrangement comprised of an injection nozzle, an injection section, and a die plate.

On the other hand, the reduced injection section perforation requirement of the injection nozzle 600 of the present invention allows greater flexibility in the number of nozzles used and the positioning of the nozzles in a particular application. Moreover, the injection nozzle 600 of the present invention allows greater simplicity while improving the flexibility of the entire system in that generic components may be fashioned so as to be essentially interchangeable with like generic components. For example, the injection nozzle 600 may standardized so as to be interchangeable with any other generic injection nozzle. The dimensions and position of the supply port inlet 342 formed in assorted injection sections may also be standardized allowing a generic injection nozzle having a standardized tip to be used with all of them. In addition, the dimensions of the threaded injection ports on the main die plate may be standardized so as to accommodate all injection nozzles having a generic threaded barrel mid-section. Likewise, the position of the threaded injection ports on the main die plate may be standardized so as to align with the supply port inlet 342 on all extruder die assemblies having a generic injection sections. Thus, by standardizing the injection nozzle 600, the injection port 520, and supply port inlet 342, extruder die assemblies having different forming die elements 220 and co-injection die inserts 320 are easily interchangeable with one another.

While the embodiment of the injection nozzle 600 illustrated in the Figures is shown as a unitary component, it is understood that other variants of the injection nozzle 600 of the present invention may be comprised of separate sections which are selectively coupled to one another.

In yet another embodiment of the present invention, a known extrudate composition of a farinaceous food product is extruded through the extruder die assembly 100 to produce a flavored direct-expanded food product that exhibits enhanced flavor characteristics requiring no post-extrusion drying or seasoning process. The production of a flavored extruded food product requiring only minimal post-extrusion processing for drying and seasoning is very appealing because of the obvious simplification in the manufacturing process. An essential feature of this embodiment of the invention is the ability to add a flavoring additive in a one-step, direct-expanded extrusion process without substantially degrading the flavoring characteristics of the additive.

U.S. Pat. No. 4,869,111 to Keller, the technical disclosure of which is hereby incorporated herein by reference, discloses a composition of farinaceous food product that is well suited for use as the flowing mass of a first extrudate in the present invention. Such an extrudate composition comprises a fluid farinaceous food mixture containing from about 5 weight percent to about 17 weight percent of at least one plasticizer selected from monosaccharides, polysaccharides, and edible alcohols, including ethanol and glycerol, and having a moisture content from about 9 weight percent to about 17 weight percent.

The food material which may be used in the process of the invention can be any farinaceous material. The material will generally be in granular or powdered form such as meal, flour, or starch derived from corn, wheat, rice, oats, barley, potatoes, rye, tapioca, and other cereal crops, legumes or tubers. The preferred farinaceous material is corn meal. The granular or powdered farinaceous food mixture used in the process contains between about 9 weight percent and about 17 weight percent moisture, based on total weight of the mixture. The farinaceous material, as it is provided from a flour milling operation, usually contains sufficient moisture to provide this level. However, if necessary, a small amount of water can be added to achieve the desired level.

The plasticizer is selected from the group consisting of monosaccharides, polysaccharides, edible alcohols and mixtures thereof. Mixtures of polysaccharides employed preferably have a substantial portion of this mixture consisting of mono-, di-, and tri-saccharides. Useful monosaccharides include, for example, glucose (dextrose) and fructose. The useful polysaccharides include disaccharides, such as sucrose and maltose, and mixtures of various chain length saccharides, such as corn syrup solids, maltodextrins, and polydextrose. The useful edible alcohols include ethanol and glycerol.

It is preferred to use plasticizers selected from the group consisting of sucrose, corn syrup solids, maltodextrin, polydextrose, and glycerol. Corn syrup solids of varying dextrose equivalents (DE) have been used successfully. One embodiment of the subject invention uses Maltrin® M365 (DE 36) manufactured and sold by Grain Processing Corporation of Muscatine, Iowa which contains about 50% saccharides of chain length of 3 saccharide units or less. However, other polysaccharide mixtures having other dextrose equivalents may be used. For example, FRO-DEX® Z 24 (DE 28) manufactured by American Maize-Products Company of Hammond, Ind. contains about 25% mono-, di-, and tri-saccharides and FRO-DEX® 42 (DE 42) contains about 45% mono-, di-, and tri-saccharides. Both of these have performed similarly when compared with the Maltrin® M365. The particular choice of plasticizer may depend on a number of practical factors, including cost and the flavor desired in the end product. Since the expanded farinaceous product may be combined with a salty flavoring (e.g., a savory cheese flavoring), it is often desired that the farinaceous product have a minimal amount of sweetness. Large amounts of sucrose, dextrose, or fructose should be avoided in such case. Corn syrup solids or maltodextrins, on the other hand, are only slightly sweet and polydextroses are essentially non-sweet. Glycerol has a slight sweetness, but its flavor is generally not considered agreeable when used at relatively high concentrations.

For producing a low-sweetness, direct-expanded farinaceous product, a mixture containing from about 4.0% to 6.0% corn syrup solids, from about 0.5% to 2.0% sucrose, from about 3.0% to 6.0% polydextrose and from about 0.5% to 2.5% glycerol, is preferred as the employed plasticizer component, based on the total weight of the farinaceous food mixture which is fed to the extrusion device.

Whereas the preceding is directed to the preparation of low sweetness expanded farinaceous products, this invention may also be used for the preparation of moderate to high sweetness expanded farinaceous products. This can be accomplished by using higher levels of the sweeter tasting plasticizers, such as sucrose, fructose, and glucose or other sweeteners known to those skilled in the art. In this case, the sweeter tasting plasticizers can be used alone or in combination with the less sweet plasticizers at levels of from about 6.0 weight percent to about 15.0 weight percent.

If desired, other conventional additives can be present in the farinaceous food mixture. For example, emulsifiers, salt, fats, food dyes and flavorings may be present in the mixture in the amounts necessary to provide a desired effect.

Thus, in accordance with the general parameters of the present invention, the known extrudate composition is extruded in a standard twin- or single-screw extrusion device fitted with the extruder die assembly 100. A flowing mass of the known extrudate composition is directed to the inlet 212 of the passageway 210 within the forming section 200 and combined with a flavored fluid additive (i.e., a flavoring and/or flavored food material) in the injection section 300. The flavored fluid additive may comprise a heat sensitive flavoring (e.g., spicy flavorings such as green pepper, chiplotle, and jalapeño; or salty dairy flavors, such as savory cheese and sour cream) or a heat tolerant flavoring (e.g., sweet flavorings such as strawberry, chocolate, vanilla, etc.). While heat tolerant flavorings are less susceptible to the adverse effects of heat induced during the manufacturing process, they can, nevertheless, benefit from the method of the present invention in that overall flavor loss is reduced producing a higher intensity of flavor at reduced concentrations.

Figure 6:
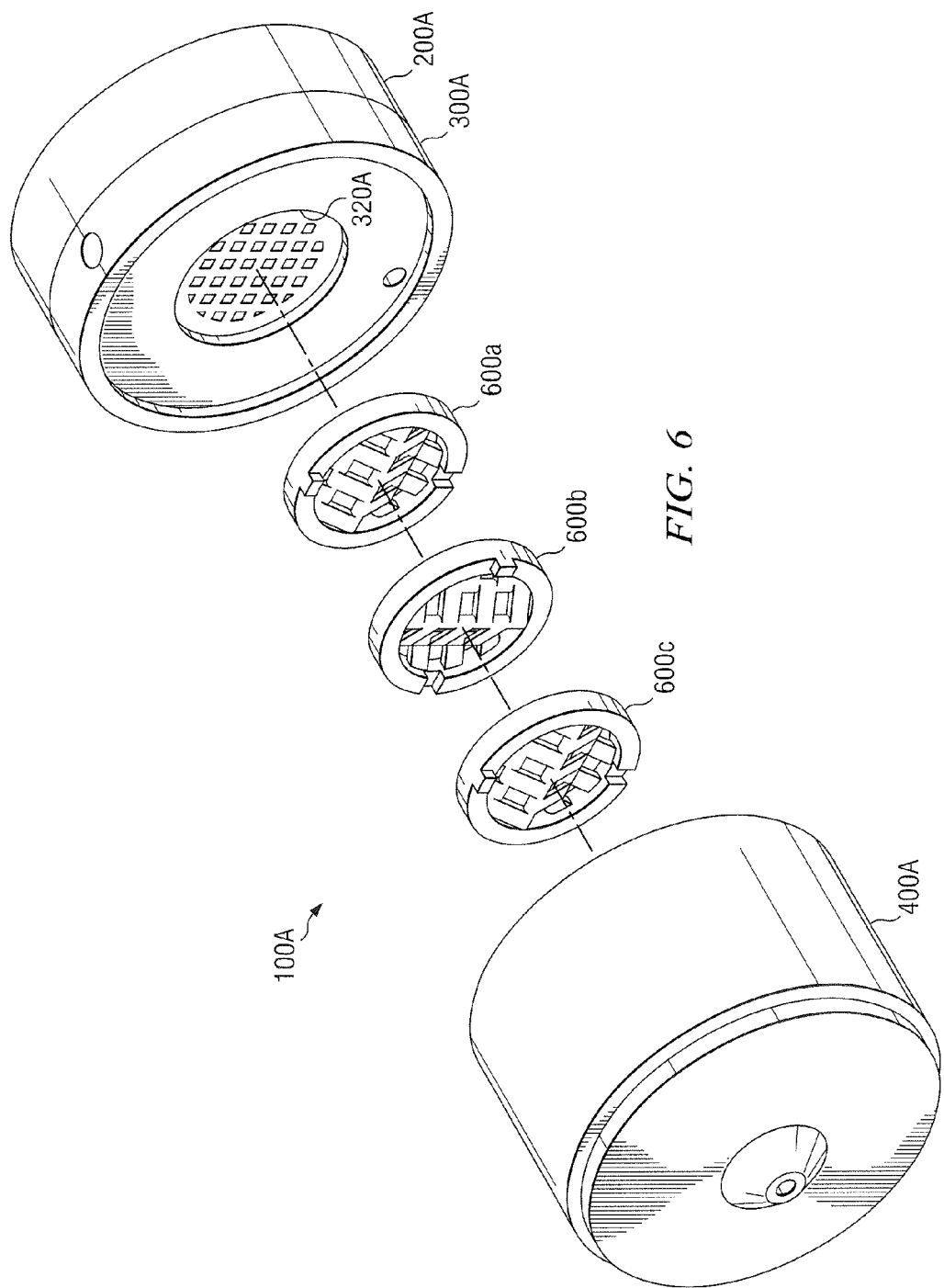
FIG. 6 is perspective in partially exploded view of an alternate embodiment of the extruder die assembly of the present invention illustrating an integral static mixer element.

While any extruder die assembly of the present invention is capable of imparting flavored fluid additive in a distinct flavor pattern in the flowing mass of the known extrudate composition, the extruder die assembly may be constructed so as to maximize the amount of flavored fluid additive that may be imparted into the flowing extrudate composition with no regard for any corresponding pattern. For example, as shown in FIG. 6, in a preferred embodiment the extruder die assembly 100A may comprise co-injection die insert 320A featuring a cross-hatched design. The cross-hatch design maximizes the amount of flavored fluid additive imparted into the cross-section of the flowing extrudate. The extruder die assembly 100A may also include static mixing elements (e.g., 600a, 600b, 600c) located downstream from the co-injection die insert 320A of the injection section 300A. The static mixing elements (e.g., 600a, 600b, 600c) serve to homogenize the flavoring or seasoning media throughout the flowing mass of extrudate. The inlet of the nozzle section 400A may be adjusted to accommodate the inclusion of static mixing elements (e.g., 600a, 600b, 600c) within the extruder die assembly 100A.

After passing through the injection section 300A and any static mixing elements (e.g., 600a, 600b, 600c), the resulting flavored food mass is then compressed through a converging nozzle bore in the nozzle section 400A such that the pressure in nozzle bore is equal to or in excess of the vapor pressure of the water in the flavored extrudate mixture, and flavored extrudate mixture through, a profile die (e.g., outlet 430A) into a zone of ambient pressure below the vapor pressure of the water in the mixture. As the flavored extrudate mixture emerges from the die into the zone of reduced pressure, a portion of the water in the mixture is vaporized, thereby causing the product to expand. The resulting extruded flavored food product has a moisture content from about 4 weight percent to about 8 weight percent and a water activity ($A_w$) from about 0.30 to about 0.45.

The extrusion device of the present invention must be capable of generating super-atmospheric pressures and elevated temperatures in the material being extruded. Preferably, the extruder employed is a twin screw extruder. The twin screw extruder houses two adjacent, parallel screws which are operated in a co-rotating mode. Suitable twin screw extruders can be obtained commercially and include, for example, a Baker-Perkins model MPF-50D twin screw extruder.

In the practice of this invention, it is preferred to employ a screw configuration which imparts relatively low shear forces to the farinaceous food material. A preferred screw for use in conjunction with a Baker Perkins MPF-50D twin screw extruder has the following configuration, proceeding from the inlet of the extruder barrel towards the extruder die assembly 100A:

First, a 10" long metering screw;
Second, a 3½" long 30° forward paddle section;
Third, a 3" long single lead screw;
Fourth, a 2" long 60° forward paddle section;
Fifth, a 6" long single lead screw;
Sixth, a 2" long 60° forward paddle section;
Seventh and last, a 3" long single lead screw.

The farinaceous food mixture is placed in a feed hopper which feeds the extruder barrel. As the mixture is moved through the extruder barrel by the action of the rotating extruder screws, the farinaceous food mixture becomes plasticized and flowable. The heat required to plasticize the mixture is generated by the shearing action of the screws. Heating and cooling devices can also be mounted along the extruder to impart or remove heat in order to obtain the desired temperature profile.

As the farinaceous food material moves through the extruder barrel, the barrel pressure increases. The pressure in the extruder barrel equals or exceeds the vapor pressure of the water in the farinaceous food mixture at all times, thus preventing the water from vaporizing prior to emergence from the extruder.

The plasticized farinaceous food mixture exits the extruder barrel and is directed to the inlet of the passageway within the forming section 200A and combined with a fluid additive (i.e., a flavoring and/or flavored food material) in the injection section 300A and extruded through outlet 430A of nozzle section 400A.

The hot, plasticized, farinaceous food mixture emerges from the outlet 430A into a zone of ambient pressure below the vapor pressure of the water in the mixture; that is, normal atmospheric pressure. Upon emerging from the extruder die assembly 100A, the now flavored plasticized, farinaceous food mixture is exposed to the reduced pressure environment, thus readily allowing a portion of the water in the mixture to vaporize so that there is formed a highly porous, puffed, cellular body. In the process of so doing, the residual moisture in the farinaceous product is reduced to a level from about 4 weight percent to about 8 weight percent.

Any suitable die configuration can be employed, depending on the particular product which one desires to make by the process of the invention. For example, as shown in the FIG. 6, the extruder die assembly 100A may have a circular cross-sectional are or a "O"-shaped opening to produce a rod of extrudate or ball-shaped extrudate.

As previously indicated, the resulting extruded food product does not require the use of a drying apparatus such as an oven to remove moisture. As it emerges from the outlet 430A of the extruder die assembly 100A, the extrudate typically has a temperature from about 121° C. to about 163° C. and is soft, yet self-supporting. The product can be subjected to further processing, e.g., segmenting and bagging, etc., as soon as it has cooled sufficiently to become rigid and dimensionally stable. If desired, air cooling or other means may be employed to assist in cooling the extrudate. By eliminating the drying and seasoning stage from the production process, the total length of a production line, excluding the extruder, for an expanded, farinaceous food product is typically reduced from about 130 feet to 30 feet or less.

The expanded product is usually cooled to near ambient temperature in about two minutes. The texture is crisp and crunchy, even though a drying oven was not used. Thus, the resulting extruded food product is suitable for providing a shelf-stable snack product.

The following example is intended to further illustrate the known extrudate composition of the invention and is not intended to limit the scope of the invention in any way.

EXAMPLE

A non-sweet, whole wheat flavored product was prepared from the following ingredients:

| Ingredients | Parts By Weight |
|---|---|
| Whole Wheat Flour | 58.09 |
| Corn Cones (Corn Meal) | 28.00 |
| Corn Syrup Solids (Dextrose Equivalent = 34- 38) | 5.00 |
| Polydextrose | 3.70 |
| Sucrose | 1.20 |
| Glycerol | 2.50 |
| Salt | 0.50 |
| Monoglycerides | 0.30 |
| Annatto Powder | 0.01 |
| Water | 0.70 |
| | 100.00 |

It will now be evident to those skilled in the art that there has been described herein an improved extruder die apparatus and method for imparting a distinct colored and/or flavored pattern into an extrudable food mass during extrusion that may be subsequently homogenized without regard to any corresponding pattern. In addition, a method for using the improved extruder die assembly with a farinaceous food composition to produce a dried, flavored, direct-expanded food product that exhibits improved flavor characteristics while requiring no post-extrusion drying or seasoning process has been described. Moreover, an injection nozzle having enhanced sealing characteristics and facilitating a non-invasive fluid connection to the improved extruder die apparatus has also been described. Although the invention hereof has been described by way of a preferred embodiment, it will be evident that other adaptations and modifications can be employed without departing from the spirit and scope thereof. For example, multiple extrusion die assemblies may be utilized in a parallel arrangement by a single extruder device. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A method for producing an expanded, farinaceous food product having enhanced flavor characteristics without the use of a drying oven, said method comprising, in combination, the following steps:
    (a) plasticizing a farinaceous food mixture into a first extrudate flow containing from about 5 weight percent to about 17 weight percent of at least one plasticizer selected from monosaccharides, polysaccharides, and edible alcohols and having a moisture content from about 9 weight percent to about 17 weight percent in an extruder barrel having a barrel pressure equal to or in excess of the vapor pressure of the water in the mixture;
    (b) directing the first extrudate flow from said extruder barrel to a central passageway;
    (c) dividing the first extrudate flow into a plurality of adjacent flowing extrudate flows;
    (d) injecting a continuous band of flavored fluid additive between said adjacent flowing extrudate flows utilizing a co-injection die insert having at least one capillary channel, wherein said fluid additive is supplied to each capillary channel via a separate channel port in fluid communication with a peripheral reservoir manifold circumscribing said central passageway;
    (e) coalescing the plurality of adjacent flowing extrudate flows into a second extrudate flow while generally maintaining the fluid additive's relative position between the plurality of adjacent flowing extrudate flows; and
    (f) extruding the second extrudate flow through a nozzle section into a zone of ambient pressure below the vapor pressure of the water in the mixture;
thereby producing a crisp flavored product having a moisture content from about 4 weight percent to about 8 weight percent and a water activity from about 0.30 to about 0.45.

2. The method of claim 1, wherein the plasticizer is selected from the group consisting of maltodextrin, polydextrose, sucrose, corn syrup solids, and glycerol.

3. The method of claim 1, wherein the plasticizer is a mixture containing from about 4% to about 6% corn syrup solids, from about 3% to about 6% polydextrose, from about 0.5% to about 2% sucrose, and from about 0.5% to about 2.5% glycerol, based on the total weight of the farinaceous food mixture.

4. The method of claim 1, comprising adding as the plasticizer from about 6 weight percent to about 15 weight percent, based on the total weight of the farinaceous food mixture, one or more of the group consisting of sucrose, maltose, fructose, dextrose, polysaccharides, and edible alcohols.

5. The method of claim 1, wherein the farinaceous food mixture is plasticized by contacting said mixture with co-rotating twin extruder screws in the extruder barrel.

6. The method of claim 1, wherein the farinaceous food mixture contains at least one material selected from the group consisting of meals, flours, and starches derived from corn, wheat, rice, oats, barley, potatoes, rye, tapioca and other cereal crops, legumes, and tubers.

7. The method of claim 1, wherein the farinaceous food mixture contains corn meal.

8. The method of claim 1, wherein said nozzle section reduces the cross sectional area of the second extrudate flow by a factor less than 20:1.

9. The method of claim 1, wherein said nozzle section reduces the cross sectional area of the second extrudate flow by a factor greater than 4:1.

10. The method of claim 1, wherein the fluid additive is colored.

11. The method of claim 10, wherein the fluid additive comprises a first color and the farinaceous food mixture comprises a second color.

12. The method of claim 1, further comprising between steps (e) and (f), the step of mixing said flavored fluid additive and said second extrudate into a more homogeneous mixture with a static mixing mechanism positioned in said passageway.

13. A method for producing an expanded, farinaceous food product having enhanced flavor characteristics without the use of a drying oven, said method comprising, in combination, the following steps:
    (a) plasticizing a farinaceous food mixture into a first extrudate flow in an extruder barrel having a barrel pressure equal to or in excess of the vapor pressure of the water in the mixture;
    (b) directing the first extrudate flow from said extruder barrel to a central passageway;
    (c) dividing the first extrudate flow into a plurality of adjacent extrudate flows;
    (d) injecting a continuous band of flavored fluid additive between said adjacent extrudate flows utilizing a co-injection die insert having at least one capillary channel, wherein said fluid additive is supplied to each capillary channel via a separate channel port in fluid communication with a peripheral reservoir manifold circumscribing said central passageway;
    (e) coalescing the plurality of adjacent extrudate flows into a second extrudate flow while generally maintaining the fluid additive band's relative position between the plurality of adjacent extrudate flows; and
    (f) extruding the second extrudate flow through a nozzle section into a zone of ambient pressure below the vapor pressure of the water in the mixture.

14. The method of claim 13, wherein said injecting step further comprises supplying said peripheral reservoir manifold with said fluid additive via a supply port in fluid communication with a fluid additive source.

15. The method of claim 13, wherein said injecting step further comprises dividing said peripheral reservoir manifold into a plurality of segregated quadrants, wherein each capillary channel is supplied with said fluid additive from a separate quadrant of said manifold.

16. The method of claim 15, wherein a first quadrant supplies a first fluid additive to a first capillary channel and a second quadrant supplies a second fluid additive to a second capillary channel.

17. The method of claim 16, wherein said injecting step further comprises supplying said first quadrant with said first fluid additive via a first supply port in fluid communication with a first fluid additive source and supplying said second quadrant with said second fluid additive via a second supply port in fluid communication with a second fluid additive source.

18. The method of claim 13, wherein the farinaceous food mixture contains at least one material selected from the group consisting of meals, flours, and starches derived from corn, wheat, rice, oats, barley, potatoes, rye, tapioca and other cereal crops, legumes, and tubers.

19. The method of claim 13, wherein said nozzle section reduces the cross sectional area of the second extrudate flow by a factor less than 20:1.

20. The method of claim 13, wherein said nozzle section reduces the cross sectional area of the second extrudate flow by a factor greater than 4:1.

21. The method of claim 13, wherein the fluid additive comprises a first color and the farinaceous food mixture comprises a second color.

22. The method of claim 13, further comprising between steps (e) and (f), the step of mixing said flavored fluid additive and said second extrudate into a more homogeneous mixture with a static mixing mechanism positioned in said passageway.

* * * * *